No. 632,034. Patented Aug. 29, 1899.
J. D. WILCOX.
POTATO DIGGER.
(Application filed Apr. 22, 1899.)
(No Model.) 2 Sheets—Sheet 1.
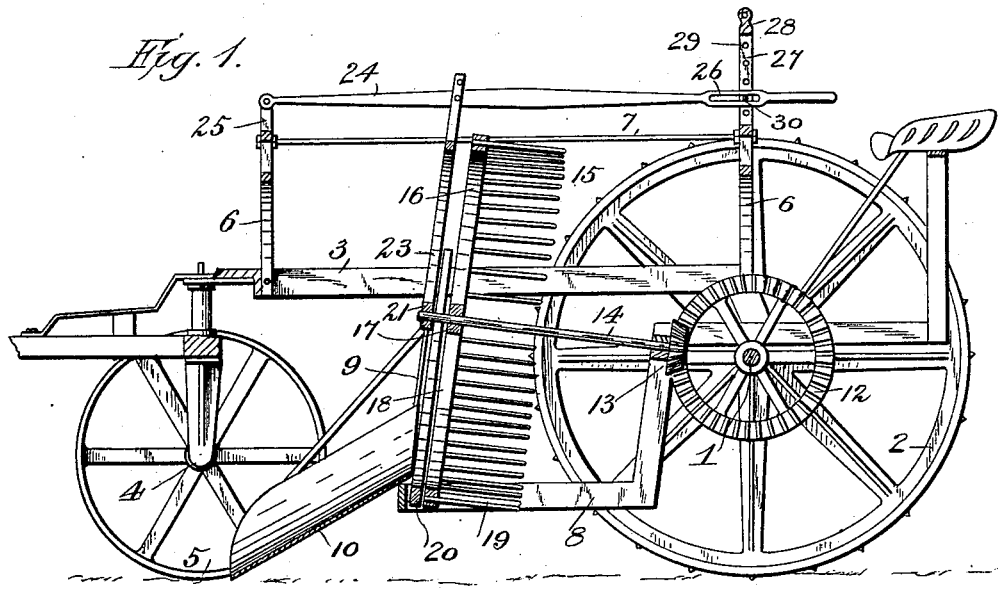
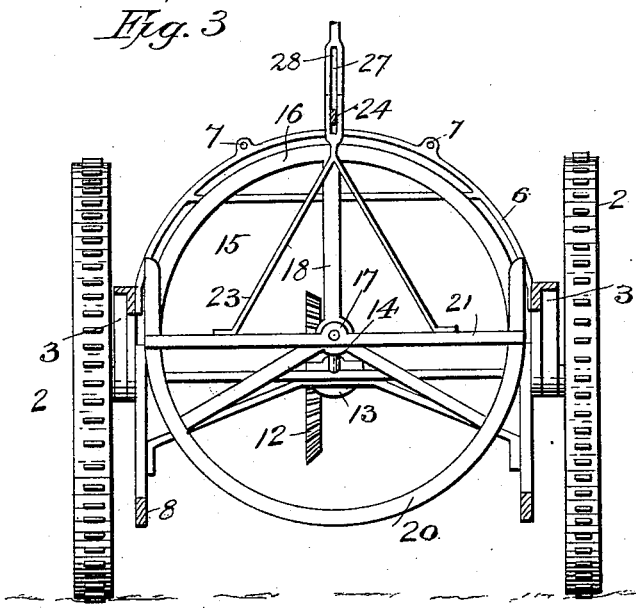
WITNESSES:
F. L. Durand
Esther V. Byng
INVENTOR:
John D. Wilcox.
BY
Louis Bagger & Co
ATTORNEYS.
THE NORRIS PETERS CO., PHOTO-LITHO., WASHINGTON, D. C.

No. 632,034. Patented Aug. 29, 1899.
J. D. WILCOX.
POTATO DIGGER.
(Application filed Apr. 22, 1899.)

(No Model.) 2 Sheets—Sheet 2.

WITNESSES:

INVENTOR:
John D. Wilcox,
BY
Louis Bagger & Co.,
ATTORNEYS.

UNITED STATES PATENT OFFICE.

JOHN D. WILCOX, OF PINE CITY, MINNESOTA.

POTATO-DIGGER.

SPECIFICATION forming part of Letters Patent No. 632,034, dated August 29, 1899.

Application filed April 22, 1899. Serial No. 714,088. (No model.)

*To all whom it may concern:*

Be it known that I, JOHN D. WILCOX, a citizen of the United States, residing at Pine City, in the county of Pine and State of Minnesota, have invented new and useful Improvements in Potato-Diggers, of which the following is a specification.

My invention relates to potato-diggers in which the potatoes are dug from the hills and then conveyed rearwardly and separated from the vines and earth and deposited on the ground from which they may be readily collected free from all extraneous matter.

The object of the invention is to provide an improved potato-digger which shall possess superior advantages with respect to efficiency in use.

The invention consists in the novel construction and combination of parts hereinafter fully described and claimed.

Figure 2:
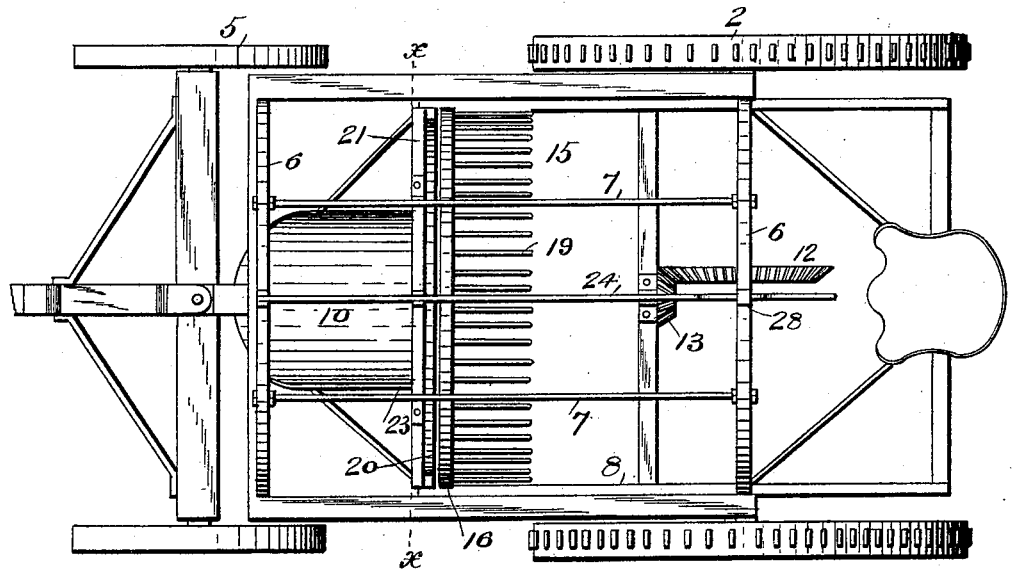
Figure 4:
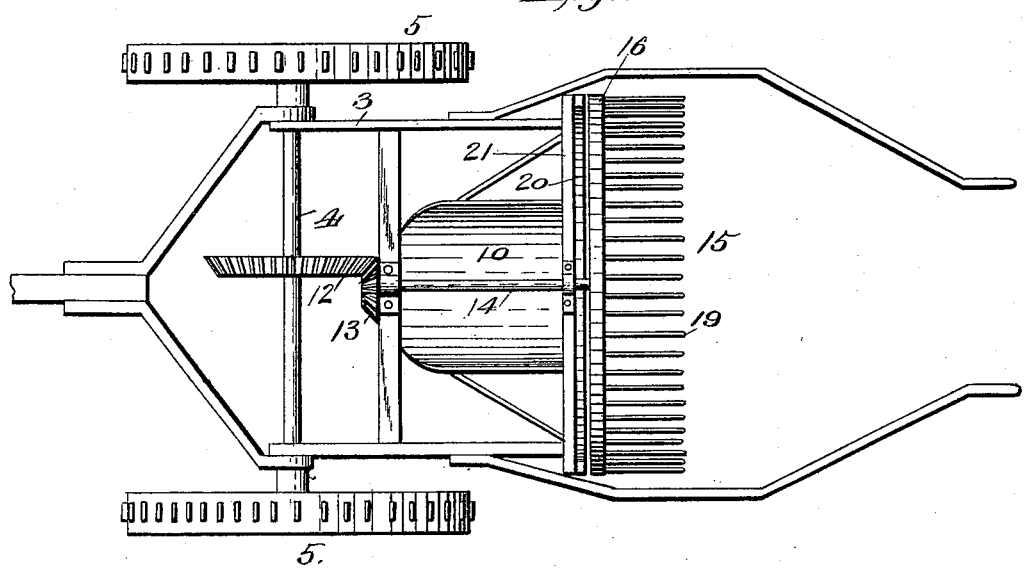

In the accompanying drawings, Figure 1 is a central longitudinal section of a potato-digger constructed in accordance with my invention. Fig. 2 is a plan view of the same. Fig. 3 is a cross-section on the line $x\,x$, Fig. 2. Fig. 4 is a plan view showing the invention applied to a walking-digger.

In the said drawings the reference-numeral 1 designates the rear axle of the machine, provided with driving or supporting wheels 2. Supported on this axle and wheels are the side bars 3, the front ends of which are connected with the front axle 4, also provided with driving-wheels 5. At the front and rear ends these side bars are provided with transverse arches 6, which are connected together by means of longitudinal bars 7. Connected with said side bars are lower angle side bars 8, the horizontal portions of which are elevated at a slight distance above the ground and at the front ends have secured thereto the shovel-frame 9. Secured to this frame is the shovel 10, which may be of any ordinary or suitable construction and which is adapted when the machine is drawn across a field to engage with a hill of potatoes and turn them from the ground.

Secured to the axle 1 is a bevel-gear 12, which meshes with a bevel-pinion 13, carried by an inclined shaft 14, located centrally in the machine. Secured to the front end of this shaft is a rotatable sieve 15, consisting of a ring or annulus 16, provided with a hub 17, and a series of radial arms 18. This rim and also the said arms are provided with a number of rearwardly-extending pins or bars 19. In front of said rotatable sieve is a semicircular fender or guard 20, the ends of which are connected together by a bar 21, on which the front journal of the shaft 14 has its bearings. This guard or fender is for the purpose of preventing injury to the rotatable sieve. Connected with the said bar 21 is a stirrup or yoke 23, the upper end of which is pivoted to a lever 24, the front end of which is pivotally connected with a vertical rod 25, secured to the front arch of the machine. Near the rear end this lever is formed with a slot 26, which passes through a vertical opening 27 of a vertical bar 28, secured to the rear arch of the machine, which bar is formed with a number of holes 29 for the passage of a pin 30, which engages with the slot in said lever and holds it in place.

In use as the machine is drawn across a field the shovel engaging with the hills of potatoes will turn up the latter, and the potatoes, earth, and vines will be carried backwardly to the sieve, which will be rapidly rotated or revolved by means of the bevel-gear and pinion. The dirt will now be caused to fly in every direction, and at every revolution of the sieve everything is cleared up from behind the shovel and carried upward and when at a certain point will fall and the potatoes will be deposited on the ground and fall farther from the sieve than the vines, so as to be readily picked up.

From the above it will be seen that the potatoes, earth, and vines are readily disengaged from the hills and the potatoes conveyed backward and separated from the earth and vines and deposited on the ground, from whence they can be readily gathered.

A machine constructed according to my invention is simple, economical, and durable, requiring practically no repairs, and in use will be found to be very efficient in performing the work for which it is intended.

In the modification shown in Fig. 4 the invention is shown applied to a walking-digger which is supported by two wheels, the other wheels shown in Fig. 1 being dispensed with. The operation of this construction of digger will be apparent to any one skilled in the art, and a detailed description is therefore not necessary.

Having thus fully described my invention, what I claim is—

1. In a potato-digger, the combination with the frame, the shovel, the semicircular fender and means for raising and lowering the same, of the hub, the rim provided with rearwardly-extending fingers, the radial arms also provided with fingers, and means for rotating said hub and rim, substantially as described.

2. In a potato-digger, the combination with the shovel and the rotatable sieve, of the semicircular fender or guard, the cross-bar connecting the upper end thereof, the stirrup connected therewith, the slotted pivoted lever and the vertical bar formed with holes and the pin for holding said lever in its adjusted position, substantially as described.

In testimony whereof I have hereunto set my hand in presence of two subscribing witnesses.

JOHN D. WILCOX.

Witnesses:
A. GRIFT,
EMMA D. GRIMM.